(12) United States Patent
Nakamura

(10) Patent No.: US 9,318,956 B1
(45) Date of Patent: Apr. 19, 2016

(54) SWITCHING POWER-SUPPLY DEVICE

(71) Applicant: Sanken Electric Co., LTD., Niiza-shi, Saitama (JP)

(72) Inventor: Masaru Nakamura, Niiza (JP)

(73) Assignee: Sanken Electric Co., LTD., Niiza-shi, Saitama (JP)

( * ) Notice: Subject to any disclaimer, the term of this patent is extended or adjusted under 35 U.S.C. 154(b) by 0 days.

(21) Appl. No.: 14/548,921

(22) Filed: Nov. 20, 2014

(51) Int. Cl.
*H02M 1/00* (2007.01)
*H02M 3/158* (2006.01)
*H02M 3/156* (2006.01)

(52) U.S. Cl.
CPC ...... *H02M 3/158* (2013.01); *H02M 2001/0025* (2013.01)

(58) Field of Classification Search
CPC .............. H02M 3/1588; H02M 3/156; H02M 2001/0016; H02M 2001/0019; H02M 3/158; H02M 2001/0032; H02M 2001/0035
USPC .......................... 323/271, 281, 282, 285, 288
See application file for complete search history.

(56) References Cited

U.S. PATENT DOCUMENTS

| | | | |
|---|---|---|---|
| 6,583,610 B2 | 6/2003 | Groom et al. | |
| 8,319,482 B2 * | 11/2012 | Matsuo | H02M 3/1588 323/224 |
| 2005/0030777 A1 * | 2/2005 | Dogome | H02J 7/0065 363/125 |
| 2011/0304309 A1 * | 12/2011 | Nakamura | H02M 3/156 323/288 |
| 2012/0032660 A1 * | 2/2012 | Nakamura | H02M 3/156 323/288 |
| 2012/0032661 A1 * | 2/2012 | Nakamura | H02M 3/156 323/288 |
| 2012/0043949 A1 * | 2/2012 | Nakamura | H02M 3/1588 323/271 |
| 2014/0152277 A1 * | 6/2014 | Nakamura | H02M 3/156 323/271 |

FOREIGN PATENT DOCUMENTS

JP 2008-072809 A 3/2008

* cited by examiner

*Primary Examiner* — Timothy J Dole
*Assistant Examiner* — Sisay G Tiku
(74) *Attorney, Agent, or Firm* — Banner & Witcoff, Ltd.

(57) ABSTRACT

A switching power-supply device configured to convert and output a first direct voltage supplied from an input power source to a second direct voltage by alternately turning on and off a first switching element connected to the input power source and a second switching element connected in series to the first switching element, the switching power-supply device includes a reference voltage generation unit; and a driving unit, wherein when a generation cycle of a timing becomes shorter than a first cycle, a reference voltage generation unit cause a slope of a ramp signal, which is to be superimposed with a first reference voltage, to become gentler than a case where a generation cycle of a timing is equal to or longer than the first cycle.

8 Claims, 13 Drawing Sheets

SWITCHING POWER-SUPPLY DEVICE

TECHNICAL FIELD

This disclosure relates to a switching power-supply device.

BACKGROUND

In a switching power-supply device for supply a power source voltage to a digital signal processing LSI (large-scale integrated circuit) or the like, a high load response performance, which suppresses, as far as possible, a fluctuation range of an output voltage due to a digital load dynamically changed, is required. In response to this requirement for load response performance, a ripple converter, in which an error amplifier being a main cause of delay elements is not used and thus load response performance is improved, has been widely used (e.g., see specifications of U.S. Pat. No. 6,583,610 and Japanese Patent Application Publication No. 2008-72809).

Because such a classic ripple converter is a type which detects a ripple voltage of the output voltage to perform a feedback control, a capacitor, as an output capacitor, having a high ESR (Equivalent Series Resistance) or the like is required to obtain a sufficient ripple signal, thereby disturbing downsizing of the system.

Therefore, recently, superimposing a Ramp signal, which is assumed as a ripple due to the ESR of the output capacitor, with a feedback voltage is performed. According to this configuration, a stable operation is possible even if a ceramic capacitor having a low ESR is used as the output capacitor.

SUMMARY

An object of this disclosure is to provide a switching power-supply device which can be stably operated even if a ceramic capacitor having a low ESR is used as an output capacitor.

A switching power-supply device of this disclosure is configured to convert and output a first direct voltage supplied from an input power source to a second direct voltage by alternately turning on and off a first switching element connected to the input power source and a second switching element connected in series to the first switching element, the switching power-supply device including: a reference voltage generation unit that generates a second reference voltage in which a ramp signal is superimposed with a first reference voltage; and a driving unit that turns the first switching element from off to on, with synchronizing with a timing, at which a feedback voltage obtained by resistance voltage dividing of the second direct voltage becomes lower than the second reference voltage, wherein when a generation cycle of the timing becomes shorter than a first cycle, the reference voltage generation unit cause a slope of the ramp signal, which is to be superimposed with the first reference voltage, to become gentler than a case where the generation cycle of the timing is equal to or longer than the first cycle.

A switching power-supply device of this disclosure is configured to convert and output a first direct voltage supplied from an input power source to a second direct voltage by alternately turning on and off a first switching element connected to the input power source and a second switching element connected in series to the first switching element, the switching power-supply device including: a feedback voltage generation unit that generates a feedback voltage in which a negative-sloped ramp signal is superimposed with a voltage obtained by resistance voltage dividing of the second direct voltage; and a driving unit that turns the first switching element from off to on, with synchronizing with a timing, at which the feedback voltage becomes lower than a reference voltage, wherein when a generation cycle of the timing becomes shorter than a first cycle, the feedback voltage generation unit cause a slope of the ramp signal, which is to be superimposed with the voltage, to become gentler than a case where the generation cycle of the timing is equal to or longer than a first cycle.

According to the switching power-supply device of this disclosure, a stable operation is possible even if a ceramic capacitor having a low ESR is used as an output capacitor.

BRIEF DESCRIPTION OF THE DRAWINGS

FIG. 10 is a view showing an example of a circuit configuration of a feed forward circuit 5a.

FIG. 11 is a view showing an example of a circuit configuration of a feed forward circuit 5a.

DESCRIPTION OF ILLUSTRATIVE EMBODIMENTS

Now, embodiments of this disclosure will be described with reference to the drawings.

Figure 1:
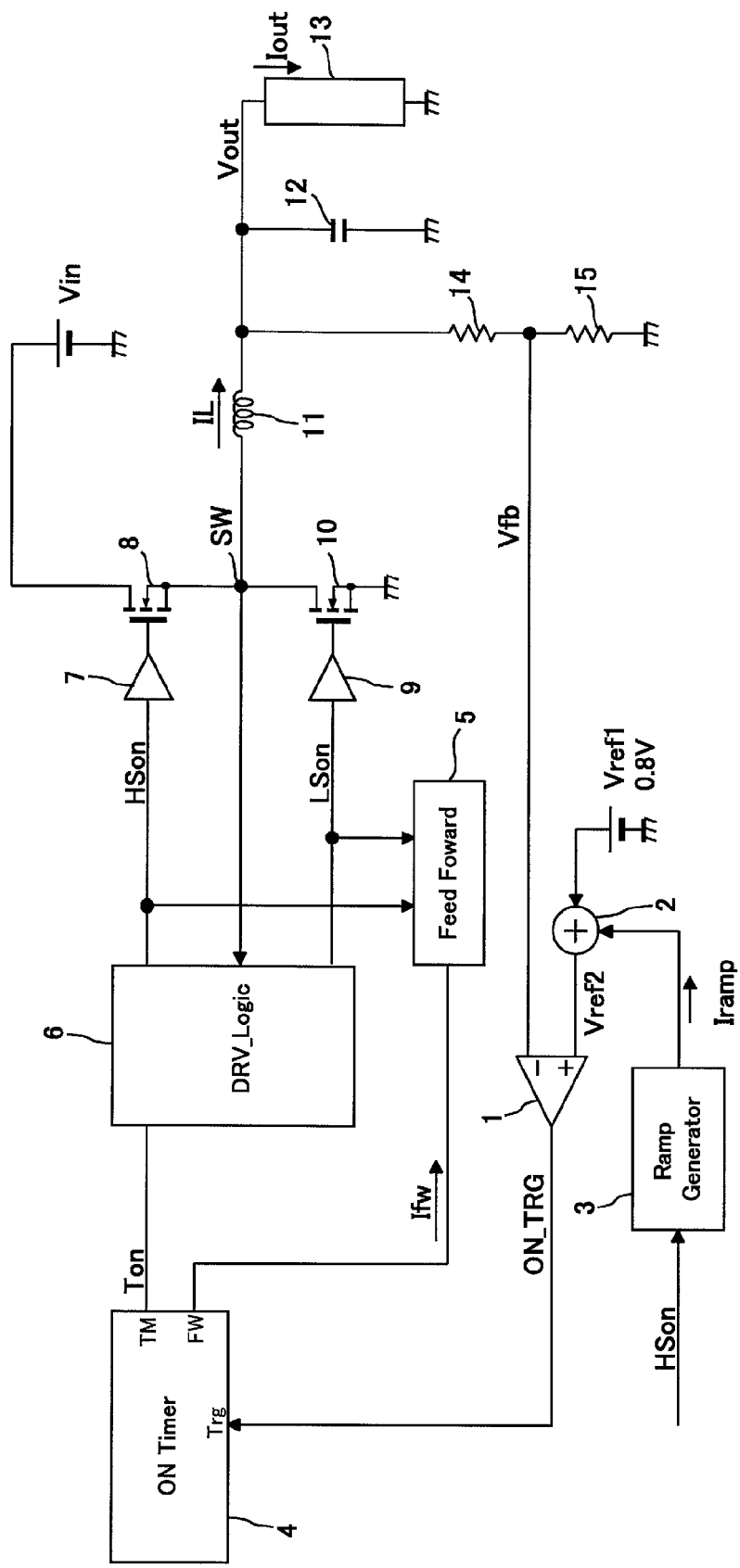
FIG. 1 is a circuit diagram of a switching power-supply device according to This disclosure.

FIG. 1 is a circuit diagram of a switching power-supply device according to an embodiment of this disclosure.

The switching power-supply device shown in FIG. 1 includes a feedback comparator 1 serving as a comparison unit, a Ramp superimposing circuit 2 serving as a superimposing unit, a ramp generator 3, an on-timer (ON Timer) 4, a feed forward circuit (Feed Forward) 5, a drive logic (DRV_Logic) 6, a high-side driver 7 serving as a driving unit, a high-side MOSFET 8, which is a first switching element, a low-side driver 9, a low-side MOSFET 10, which is a second switching element, an inductor 11, an output capacitor 12, a feedback resistor 14, and a feedback resistor 15.

The switching power-supply device shown in FIG. 1 is adapted to convert and output a first direct voltage Vin, which is supplied from an input power source, into a second direct voltage (output voltage Vout) by alternately turning on and off the high-side MOSFET 8 and the low-side MOSFET 10.

The high-side MOSFET 8 is connected to the input power source for supplying the first direct voltage Vin.

The high-side MOSFET 8 is driven on and off as a gate voltage thereof is controlled by the high-side driver 7. The high-side driver 7 turns on the high-side MOSFET 8 during a period, during which a driving signal HSon supplied from the drive logic 6 is high, and turns off the high-side MOSFET 8 during other than the period.

The low-side MOSFET 10 is connected in series to the high-side MOSFET 8.

The low-side MOSFET 10 is driven on and off as a gate voltage thereof is controlled by the low-side driver 9. The low-side driver 9 turns on the low-side MOSFET 10 during a period, during which a driving signal LSon supplied from the drive logic 6 is high, and turns off the low-side MOSFET 10 during other than the period.

One end of the inductor 11 is connected to a connection point SW between the high-side MOSFET 8 and the lower side MOSFET 10, and the other end thereof is connected to a load circuit 13. A current flowing through the inductor 11 is referred to as a current IL. The load circuit 13 is, for example, a digital signal processing LSI.

The output capacitor 12 is connected between a ground and a connection point between the inductor 11 and the load circuit 13.

A serial circuit of the feedback resistor 14 and the feedback resistor 15 is connected between the ground and a connection point between the inductor 11 and the capacitor 12.

To an inverted input terminal of the feedback comparator 1, a connection point between the feedback resistor 14 and the feedback resistor 15 is connected. To a non-inverted input terminal of the feedback comparator 1, the Ramp superimposing circuit 2 is connected.

A feedback voltage Vfb, which is exhibited at the connection point between the feedback resistor 14 and the feedback resistor 15, is a voltage obtained by detecting the output voltage Vout of the switching power-supply device by resistance voltage dividing with the feedback resistors 14 and 15.

The Ramp superimposing circuit 2 is connected to a power source for supplying a first reference voltage Vref1 and the ramp generator 3.

The Ramp superimposing circuit 2 overlaps a Ramp current signal Iramp (a positive-sloped signal in which a signal level thereof is linearly increased over time), which is generated by the ramp generator 3, with the first reference voltage Vref1 to generate a second reference voltage Vref2, and then outputs the second reference voltage Vref2 to the non-inverted input terminal of the feedback comparator 1. The Ramp superimposing circuit 2 and the ramp generator 3 serve as a reference voltage generation unit for generating the second reference voltage Vref2.

Figure 2:
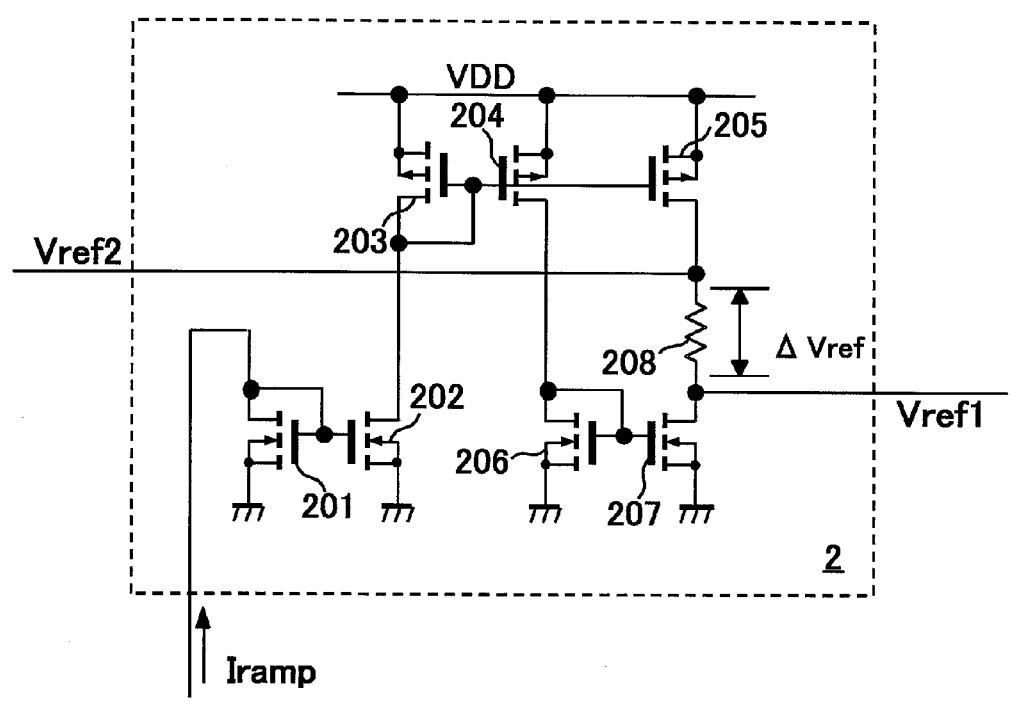
FIG. 2 is a view showing an example of a circuit configuration of a Ramp superimposing circuit 2.

FIG. 2 is a view showing an example of a circuit configuration of the Ramp superimposing circuit 2.

The Ramp superimposing circuit 2 includes MOSFETs 201 to 207 and a resistor 208. To a MOSFET 205 side terminal of the resistor 208, the non-inverted input terminal of the feedback comparator 1 is connected. To a MOSFET 207 side terminal of the resistor 208, the power source for supplying the first reference voltage Vref1 is connected.

The Ramp superimposing circuit 2 generates the second reference voltage Vref2, in which a positive-sloped Ramp component (ΔVref) is superimposed with the first reference voltage Vref1, by supplying the Ramp current signal Iramp, which is generated by the ramp generator 3, to a MOSFET 205 side of the resistor 208 and also by withdrawing the Ramp current signal Iramp from a MOSFET 207 side of the resistor 208.

The circuit configuration of FIG. 2 is one example, and the Ramp superimposing circuit 2 may have any configuration which can overlap a ramp signal (Ramp current signal Iramp), which is generated by the ramp generator 3, with the first reference voltage Vref1.

Returning to FIG. 1, the feedback comparator 1 compares the feedback voltage Vfb with the second reference voltage Vref2, and then outputs a ON_TRG signal as an effective signal to a Trg terminal of the on-timer 4 if the feedback voltage Vfb is lower than the second reference voltage Vref2.

The feed forward circuit 5 generates and outputs a feed forward current Ifw, which is intended to maintain a substantially constant switching frequency even if setting of the input voltage Vin or the output voltage Vout is changed, to a FW terminal of the on-timer 4.

The feed forward current Ifw is a signal depending on a ratio between a period, during which the high-side MOSFET 8 is turned on, and a period, during which the low-side MOSFET 10 is turned on.

The feed forward circuit 5 serves as a signal output unit for outputting the signal depending on the ratio between the period, during which the high-side MOSFET 8 is turned on, and the period, during which the low-side MOSFET 10 is turned on.

Figure 3:
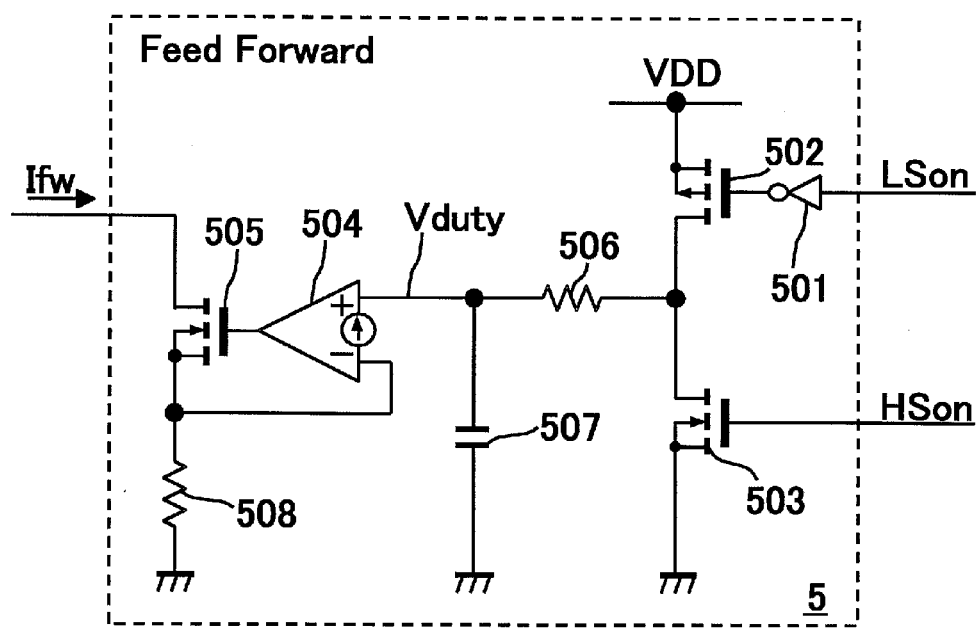
FIG. 3 is a view showing an example of a circuit configuration of a feed forward circuit 5.

FIG. 3 is a view showing an example of a circuit configuration of the feed forward circuit 5.

The feed forward circuit 5 includes a PchMOSFET 502 and an NchMOSFET 503, which are connected in series between a power source VDD and the ground. To a gate of the PchMOSFET 502, the driving signal LSon is inputted via an inverter 501. To a gate of the NchMOSFET 503, the driving signal HSon is inputted.

Additionally, the feed forward circuit 5 includes an operational amplifier 504, a resistor 506 connected at one end thereof to a connection point between the PchMOSFET 503 and the NchMOSFET 503 and at the other end to an non-inverted input terminal of the operational amplifier 504, a capacitor 507 connected between the ground and a connection point between the other end of the resistor 506 and the non-inverted input terminal of the operational amplifier 504, an NchMOSFET 505 connected to an output of the operational amplifier 504, and a resistor 508 connected between the NchMOSFET 505 and the ground. The inverted input terminal of the operational amplifier 504 is connected to a connection point between the NchMOSFET 505 and the resistor 508.

The feed forward circuit 5 shown in FIG. 3 turns alternately on and off the PchMOSFET 502 and the NchMOSFET 503 in response to the driving signal HSon and the driving signal LSon, thereby charging and discharging the capacitor 507 through the resistor 506.

The resistor 506 and the capacitor 507 configure a low-pass filter, of which a cut-off frequency is sufficiently lower than a switching cycle of the high-side MOSFET 8 and the low-side MOSFET 10. Accordingly, a voltage signal Vduty, which become substantially direct current and is changed in a decreasing direction as a ratio between a period during which the driving signal HSon is High and a period during which the driving signal LSon is High is decreased (as a voltage difference between the input voltage Vin and the output voltage Vout is reduced), is generated in the capacitor 507.

The operational amplifier 504, the NchMOSFET 505 and the resistor 508 configure a voltage-current conversion circuit. According to this voltage-current conversion circuit, the feed forward current Ifw changed in response to the voltage signal Vduty is generated and outputted to the FW terminal of the on-timer 4.

When receiving the ON_TRG signal, the on-timer 4 switches a Ton signal, which is outputted from a terminal TM, from Low to High. The Ton signal is outputted to the drive logic 6.

After switching the Ton signal to High, the on-timer 4 switches the Ton signal from High to Low at a timing depending on a magnitude of the feed forward current Ifw outputted from the feed forward circuit 5.

Figure 4:
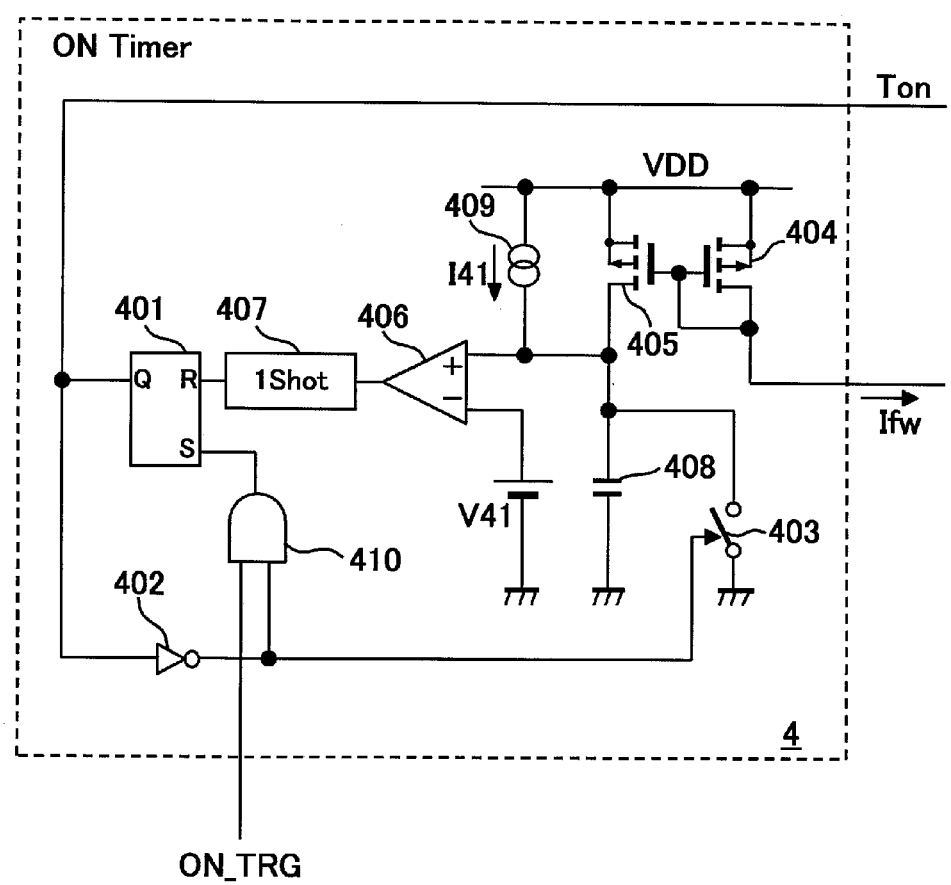
FIG. 4 is a view showing a circuit configuration example of an on-timer 4.

FIG. 4 is a view showing a circuit configuration example of the on-timer 4.

The on-timer 4 includes an SR flip-flop 401, an inverter 402 to which the Ton signal outputted from the SR flip-flop 401 is inputted, an AND circuit 410 to which the ON_TRG signal and an output signal of the inverter 402 are inputted, a switch 403 controlled on and off by the inverter 402, a 1-Shot circuit 407, a comparator 406, a constant current source 409, a MOSFET 404 to which the feed forward current Ifw is inputted, a MOSFET 405 through which the same current as a current flowing in the MOSFET 404 is flowed, and a capacitor 408 connected in series to the MOSFET 405.

An output of the 1-Shot circuit 407 is connected to a reset terminal R of the SR flip-flop 401, and an output of the And circuit 410 is connected to a set terminal S of the SR flip-flop 401.

To the 1-Shot circuit 407, an output of the comparator 406 is connected.

The constant current source 409 and the capacitor 408 are connected to a non-inverted input terminal of the comparator 406, and a power source for supplying a reference voltage V41 is connected to an inverted input terminal of the comparator 406.

The on-timer 4 shown in FIG. 4 causes the SR flip-flop 401 to become a set state in response to the ON_TRG signal from the feedback comparator 1 during a period, during which the switch 403 is turned on, thereby outputting the Ton signal to the drive logic 6.

When the Ton signal is switched from Low to High, the switch 403 is turned from on to off via the inverter 402, and then charging of the capacitor 408 is started. A charging current of the capacitor 408 is determined by the sum of the feed forward current Ifw from the feed forward circuit 5 and a current I41 flowing in the constant current source 409.

Accordingly, in a condition where a voltage difference between the input voltage Vin and the output voltage Vout is small and an on-duty width of the high-side MOSFET 8 is wide (a ratio of an on-period of the low-side MOSFET 10 to an on-period the high-side MOSFET 8 is small), the charging current of the capacitor 408 is controlled to become smaller.

In contrast, in a condition where the voltage difference between the input voltage Vin and the output voltage Vout is large, the charging current of the capacitor 408 is controlled to become larger.

When a potential of both ends of the capacitor 408 is larger than the reference voltage V41, the output of the comparator 406 is switched from Low to High. In response to such a High output, the 1-Shot circuit 407 supplies a reset signal to the SR flip-flop 401 during a predetermined period of time. Thus, the Ton signal is switched from High to Low.

In this way, as the voltage difference between the input voltage Vin and the output voltage Vout is increased, the on-timer 4 causes outputting of the comparator 406 to be earlier carried out, thereby controlling a period, during which the Ton signal is High, to be shortened.

The drive logic 6 sets the driving signal HSon to High during a period, during which the Ton signal from the on-timer 4 is High. The drive logic 6 sets the driving signal LSon to High during a regeneration-period of the current IL of the inductor 11, after switching the driving signal HSon from High to Low.

Then, when the regeneration-period of the inductor 11 is ended and a reversal in polarity of a current flowing in the inductor 11 is detected by a voltage signal from the connection point SW, the drive logic 6 switches the driving signal LSon from High to Low, thereby preventing an excessive backflow of the inductor current IL.

In this way, at a timing, at which the ON_TRG signal is switched to High and then the Ton signal is switched to High, i.e., at a timing synchronized with the ON_TRG signal, the drive logic 6 sets the driving signal HSon to High, thereby turning the high-side MOSFET 8 from off to on. The on-timer 4 and the drive logic 6 serve as a driving signal generation unit for generating the driving signal HSon.

Figure 5:
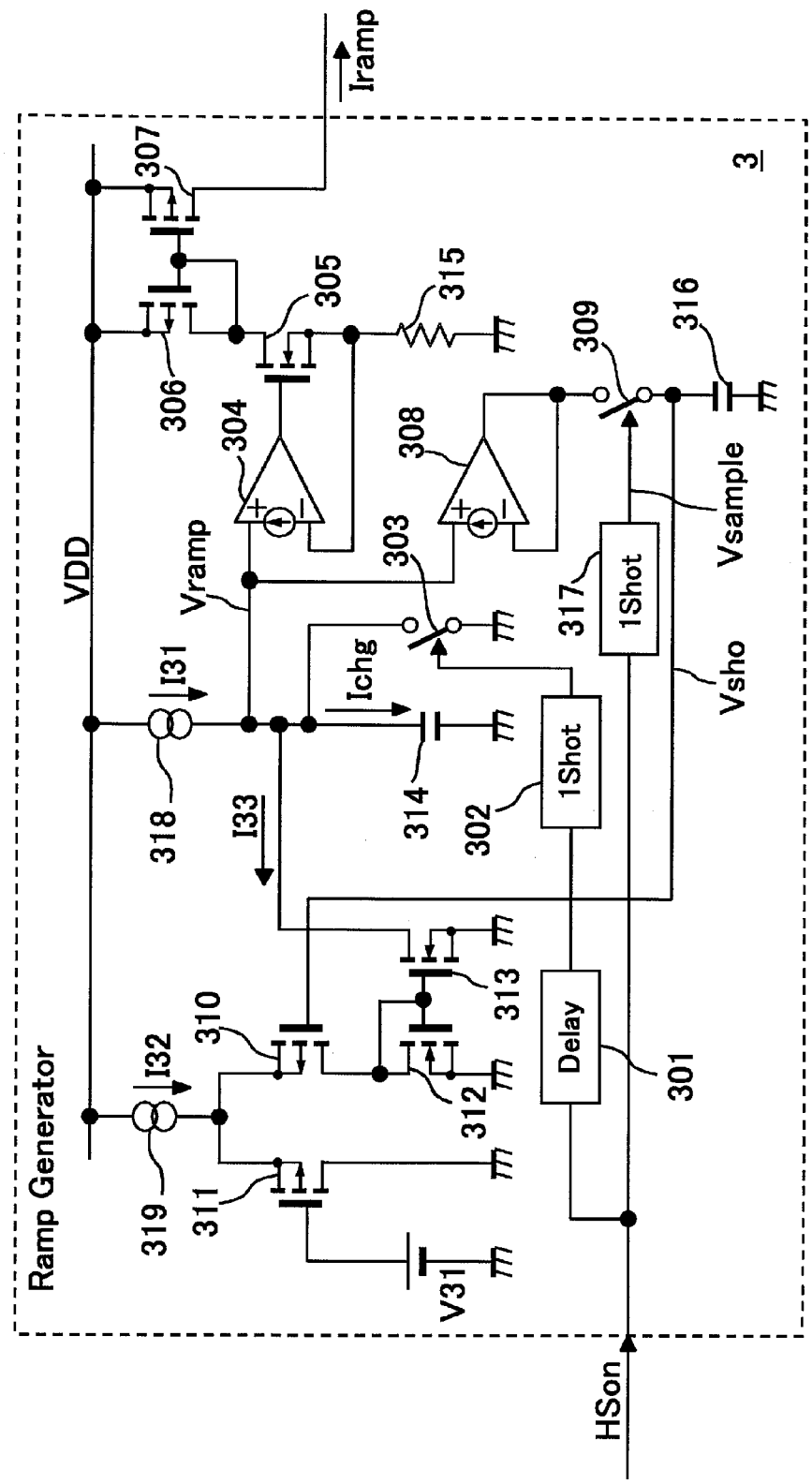
FIG. 5 is a view showing an example of a circuit configuration of a ramp generator 3.

FIG. 5 is a view showing a circuit configuration example of the ramp generator 3.

The ramp generator 3 shown in FIG. 5 includes a capacitor 314; a voltage-current conversion circuit configured by an operational amplifier 304, an NchMOSFET 305, a resistor 315, a PchMOSFET 306 and a PchMOSFET 307; a sample hold circuit configured by an operational amplifier 308, a switch 309, a capacitor 316 and a 1-Shot circuit 317; an operational transconductance amplifier configured by a PchMOSFET 311, a PchMOSFET 310, an NchMOSFET 312, an NchMOSFET 313, a constant current source 319 and a power source for supplying a reference voltage V31; a constant current source 318; and a charging and discharging circuit configured by a switch 303, a 1-Shot circuit 302 and a delay circuit (Delay) 301.

To the capacitor 314, the voltage-current conversion circuit, the sample hold circuit and the operational transconductance amplifier are connected.

In the ramp generator 3, in response to that the driving signal HSon is switched from Low to High, the 1-Shot circuit 302 turns on the switch 303 during a predetermined period of time after a delay time determined in the delay circuit 301 is elapsed, thereby discharging charges of the capacitor 314.

The ramp generator 3 turns off the switch 303 after a predetermined period of time determined in the 1-Shot circuit 302 is elapsed, and thus starts charging of the capacitor 314 with a current, which is obtained by subtracting a current I33, as described below, from a current I31 supplied form the constant current source 318, thereby generating the Ramp voltage signal Vramp. In this way, the charging and discharging circuit configured by the switch 303, the 1-Shot circuit 302 and the delay circuit 301 serves as a charging-and-discharging unit for discharging the capacitor 314 by receiving the driving signal HSon and then charging the capacitor 314 until the driving signal HSon is received.

The voltage-current conversion circuit configured by the operational amplifier 304, the NchMOSFET 305, the resistor 315, the PchMOSFET 306 and the PchMOSFET 307 outputs the Ramp current signal Iramp depending on the Ramp voltage signal Vramp to the Ramp superimposing circuit 2.

On the other hand, the Ramp voltage signal Vramp is inputted to the sample hold circuit configured by the operational amplifier 308, the switch 309, the capacitor 316 and the 1-Shot circuit 317. The 1-Shot circuit 317 turns on the switch 309 during a predetermined period of time at a timing, at which the driving signal HSon is switched from Low to High. Thus, a voltage signal Vsho obtained by sample-holding the Ramp voltage signal Vrmap at the timing, at which the driving signal HSon is switched from Low to High is generated. The sample hold circuit serves as a voltage holding unit for holding a voltage (voltage signal Vsho) of the capacitor 314 at a timing, at which the high-side MOSFET 8 is turned from off to on in response to the driving signal HSon.

The operational transconductance amplifier configured by the PchMOSFET 311, the PchMOSFET 310, the NchMOSFET 312, the NchMOSFET 313, the constant current source 319 and the power source for supplying the reference voltage V31 compares the voltage signal Vsho with the reference voltage V31 and generates the current I33, which is changed in an increasing direction as the voltage signal Vsho is decreased relative to the reference voltage V31.

A current output terminal of the operational transconductance amplifier is connected to a connection point between the constant current source 318 and the capacitor 314. Accordingly, as the current I33 is increased, a charging current Ichg of the capacitor 314 is decreased so that a slope of the Ramp voltage signal Vramp becomes gentle, and therefore a slope of the Ramp current signal Iramp becomes gentle. As a result, a slope of the second reference voltage Vref2, which is an output signal of the Ramp superimposing circuit 2, becomes gentle. The operational transconductance amplifier serves as a charging current control unit for controlling the charging current for the capacitor 314.

Next, operations immediately after an output current Iout is suddenly changed from a constant state at a light load to a heavy load will be described with reference to FIG. 6.

In a condition where the output current Iout is constant, energy is supplied from the input voltage Vin to the output capacitor 12 and the load circuit 13 through the inductor 11 during a period, during which the high-side MOSFET 8 is turned on, thereby slightly increasing the output voltage Vout.

During a period, during which the high-side MOSFET 8 is turned off, the output capacitor 12 is discharged by the output current Iout, and thus the output voltage Vout is slightly decreased. Accordingly, a ripple voltage similar to that in the output voltage Vout is also generated in the feedback voltage Vfb.

The feedback comparator 1 compares the feedback voltage Vfb with the second reference voltage Vref2 having a positive slope and then outputs the ON_TRG signal when the feedback voltage Vfb is lower than the second reference voltage Vref2.

If the ON_TRG signal is outputted, the high-side MOSFET 8 is turned on during a predetermined period of time determined in the feed forward circuit 5. At this time, energy is transferred to the output capacitor 12 through the inductor 11, and thus the output voltage Vout is again increased. By repeating these operations, the switching power-supply device is stably operated at a substantially constant switching frequency.

Here, if the output current Iout is switched from the light load to the heavy load, the output voltage Vout is temporarily decreased due to delay of feedback control, and therefore the feedback voltage Vfb is also decreased. At this time, the feedback voltage Vfb is lower than the second voltage Vref2 at a timing earlier than a timing during a normal operation.

As a result, a timing, at which the ON_TRG signal is outputted, is earlier than a timing in which the output current Iout is constant, and thus the switching frequency is controlled to be increased temporarily. Accordingly, load response performance is improved.

In the ramp generator 3, in response to where the ON_TRG signal is outputted and the driving signal HSon for driving the high-side MOSFET 8 is switched from Low to High, the 1-Shot circuit 317 turns on the switch 309 during a predetermined period of time. Therefore, the voltage signal Vsho, which is a value of the Ramp voltage signal Vramp at a timing at which the ON_TRG signal is switched to high level, is maintained in the capacitor 316.

Since a timing, at which the feedback voltage Vfb is lower than the second reference voltage Vref2, is earlier than that during a normal operation in which a load is constant, the voltage signal Vsho at this time has a lower value. In response to where the voltage signal Vsho has such a lower voltage value, the charging current for the capacitor 314 is decreased, and thus a slope of the second reference voltage Vref2 becomes gentler than that during a normal operation in which a load is constant.

If the second reference voltage Vref2 becomes gentler, the timing, at which the feedback voltage Vfb is lower than the second reference voltage Vref2, becomes later, and therefore a pause period of the high-side MOSFET 8 is increased. Accordingly, the output voltage Vout is slowly increased without overshooting. Thereafter, if the output voltage Vout is recovered to a predetermined voltage, a stable normal operation at a constant switching frequency is resumed.

According to a series of operations as described above, when the output current Iout is suddenly changed from the light load to the heavy load and the output voltage Vout is decreased, the high-side MOSFET 8 is immediately turned on to perform a high frequency oscillation operation, thereby achieving a high load response performance, and further, immediately after the high frequency oscillation, a pause period of the high-side MOSFET 8 is actively extended, thereby suppressing overshooting of the output voltage.

As described above, the switching power-supply device shown in FIG. 1 compares a magnitude of the voltage signal Vsho, which is held in the capacitor 316, with the reference voltage V31, thereby deciding that a generation cycle of a timing, at which due to a sudden load change, the output voltage Vout is decreased and the feedback voltage Vfb becomes lower than the second reference voltage Vref2, i.e., an output cycle of the ON_TRG signal has been shortened. In other words, a time period of the output cycle of the ON_TRG signal is decided by comparing the voltage signal Vsho, which corresponds to the output cycle of the ON_TRG signal, with the reference voltage V31.

In addition, the switching power-supply device decrease the charging current for the capacitor 314 as the voltage signal Vsho becomes smaller, so that a slope of the Ramp current signal Iramp becomes gentle. As the slope of the Ramp current signal Iramp becomes gentle, a period of time taken until the feedback voltage Vfb becomes lower than the second reference voltage Vref2 can be lengthened and the switching frequency of the high-side MOSFET 8 can be lowered at an earlier stage, thereby suppressing overshooting of the output voltage.

In a case where the output voltage Vout is decreased due to a sudden load change, if a period, during which the switching frequency of the high side MOSFET 8 is high, is continued so that the output voltage Vout is recovered to a predetermined voltage, the output voltage Vout continues to increase due to energy accumulated in the inductor 11 during such a period, even after the output voltage Vout is reached to the predetermined voltage. Accordingly, there is a risk in that a large overshoot is occurred, and the load circuit 13 may be broken in the worst case.

As a countermeasure against such an overshoot, a configuration, in which a phase advance capacitor is provided, can be also conceived, but in such configuration, the output capacitor 12 needs to have an increased size, thereby disturbing downsizing and cost reduction of a control board.

Figure 7:
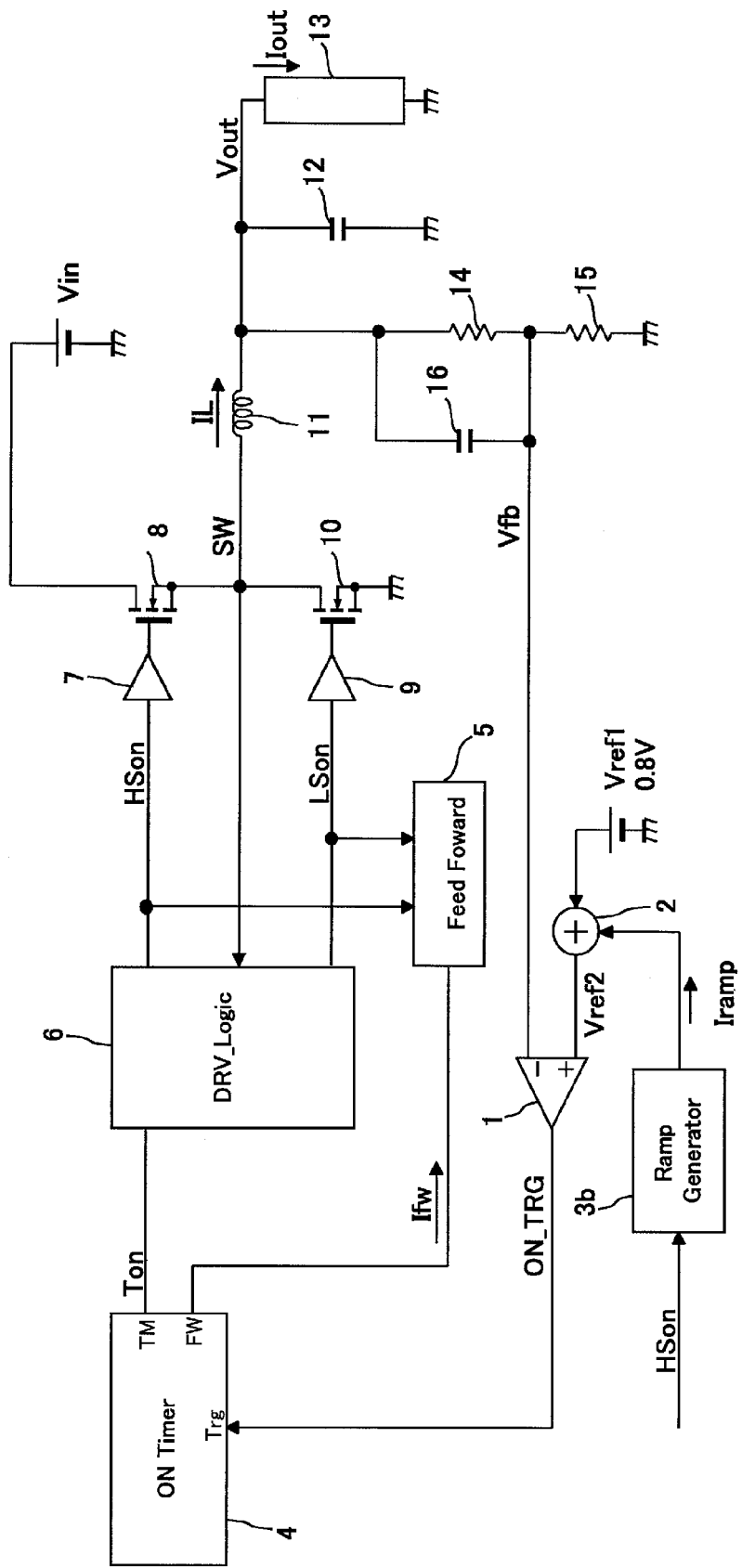
FIG. 7 is a view showing a reference example of a switching power-supply device.
Figure 8:
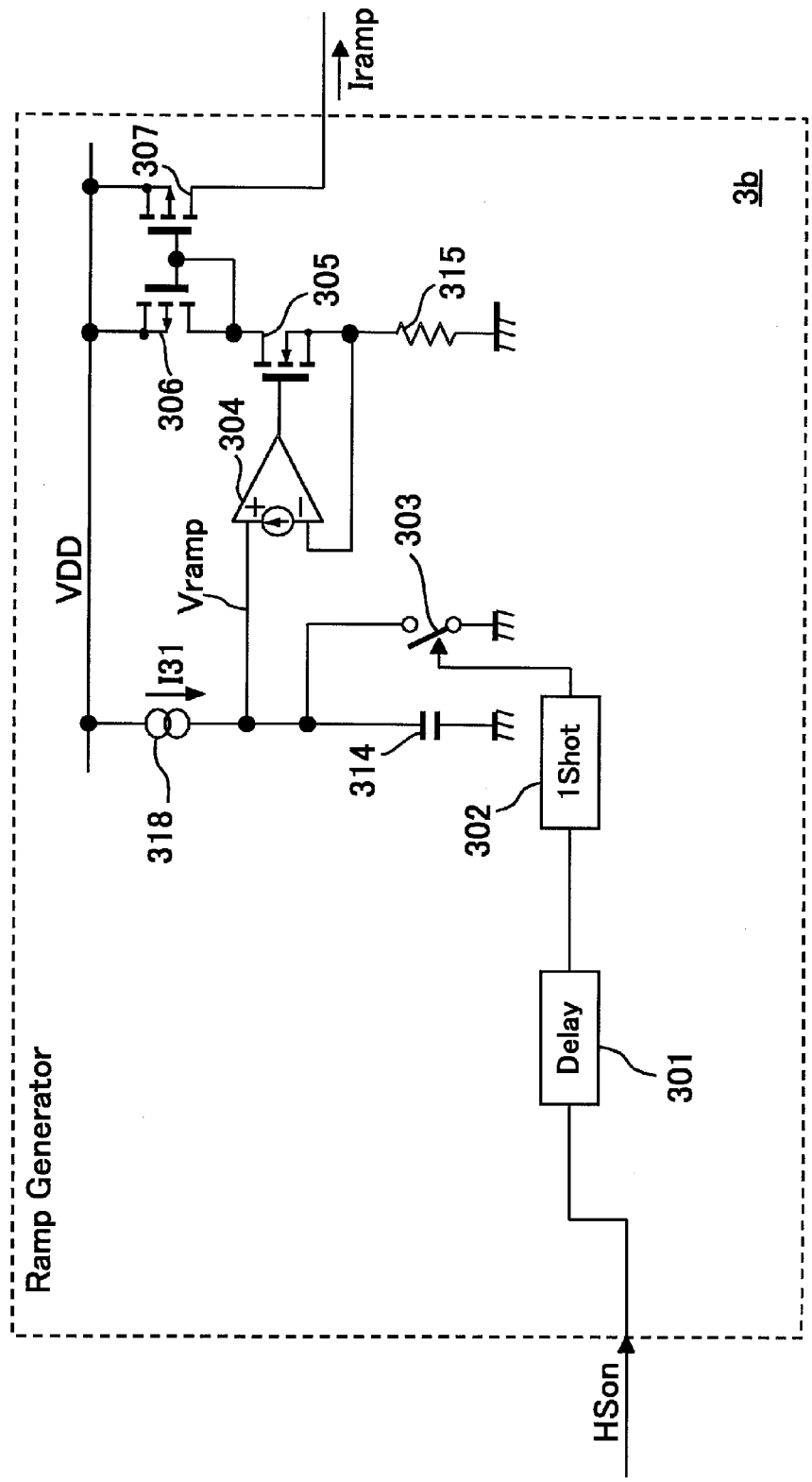
FIG. 8 is a view showing a circuit configuration of a ramp generator 3b of the switching power-supply device shown in FIG. 7.

FIG. 7 is a view showing a reference example of a switching power-supply device. FIG. 8 is a view showing a circuit configuration of a ramp generator 3b of the switching power-supply device shown in FIG. 7.

The switching power-supply device shown in FIG. 7 has the same configuration as that of the switching power-supply device shown in FIG. 1, except that the ramp generator 3 is replaced with the ramp generator 3b and a phase capacitor 16 is added.

As shown in FIG. 8, the ramp generator 3b has a configuration in which the sample hold circuit and the operational transconductance amplifier are omitted from the configuration of the ramp generator 3 shown in FIG. 3.

Figure 9:
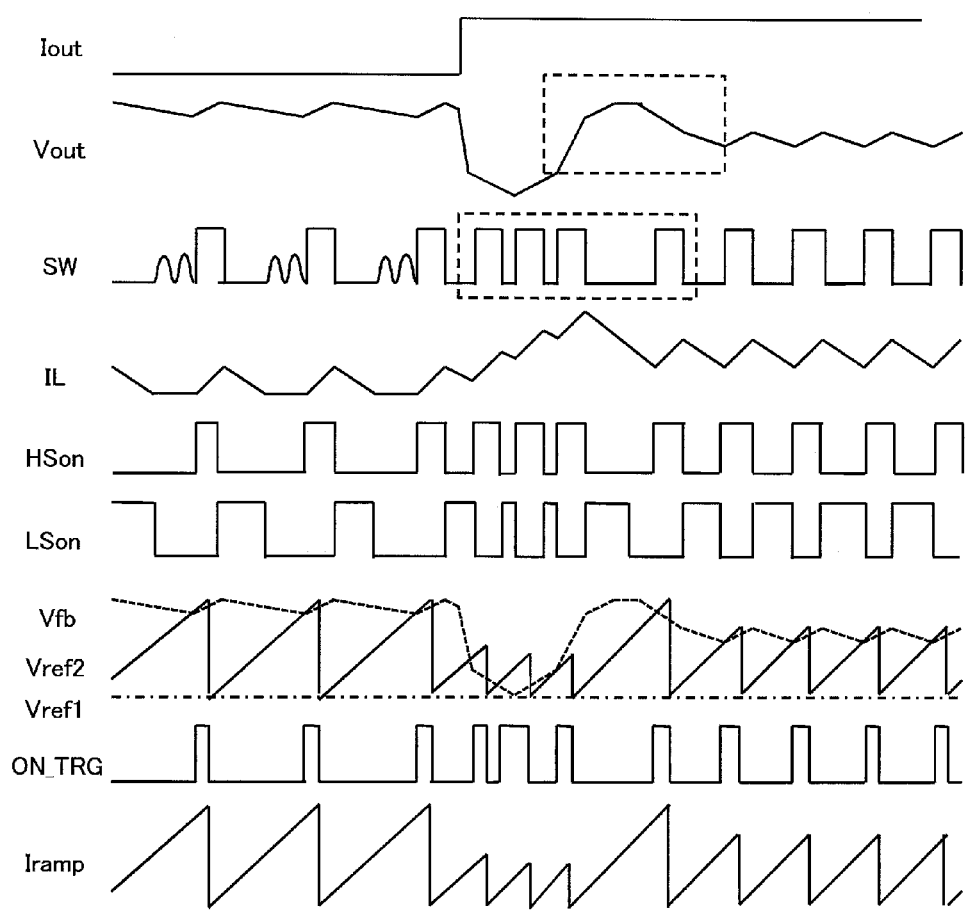
FIG. 9 is a timing chart showing operations of the switching power-supply device shown in FIG. 7.

FIG. 9 is a timing chart showing operations of the switching power-supply device shown in FIG. 7.

Figure 6:
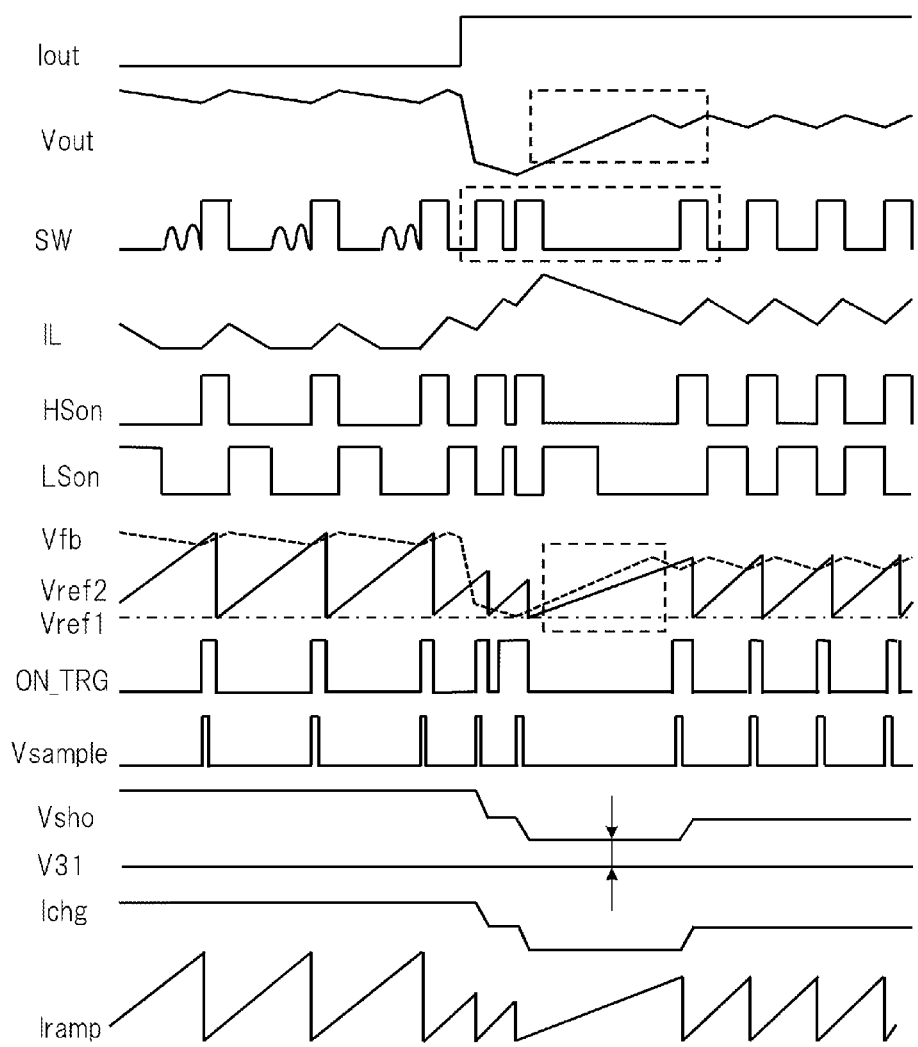
FIG. 6 is a timing chart showing operations of the switching power-supply device shown in FIG. 1.

As shown in FIG. 9, in the switching power-supply device shown in FIG. 7, if the output voltage Vout is decreased due to a load change, a state where the switching frequency of the high-side MOSFET 8 is high is lengthened, as compared to that in FIG. 6. Accordingly, overshoot is occurred.

In contrast, according to the switching power-supply device shown in FIG. 1, as the output cycle of the ON_TRG signal is shortened, the slope of the Ramp current signal Iramp is controlled to become gentle, thereby preventing a large overshoot from being occurred without providing the phase advance capacitor. Accordingly, downsizing and cost reduction of the control board are possible.

Also, according to the switching power-supply shown in FIG. 1, the output cycle of the ON_TRG signal is temporarily shortened immediately after a load has been changed, thereby ensuring a load response performance.

Figure 10:
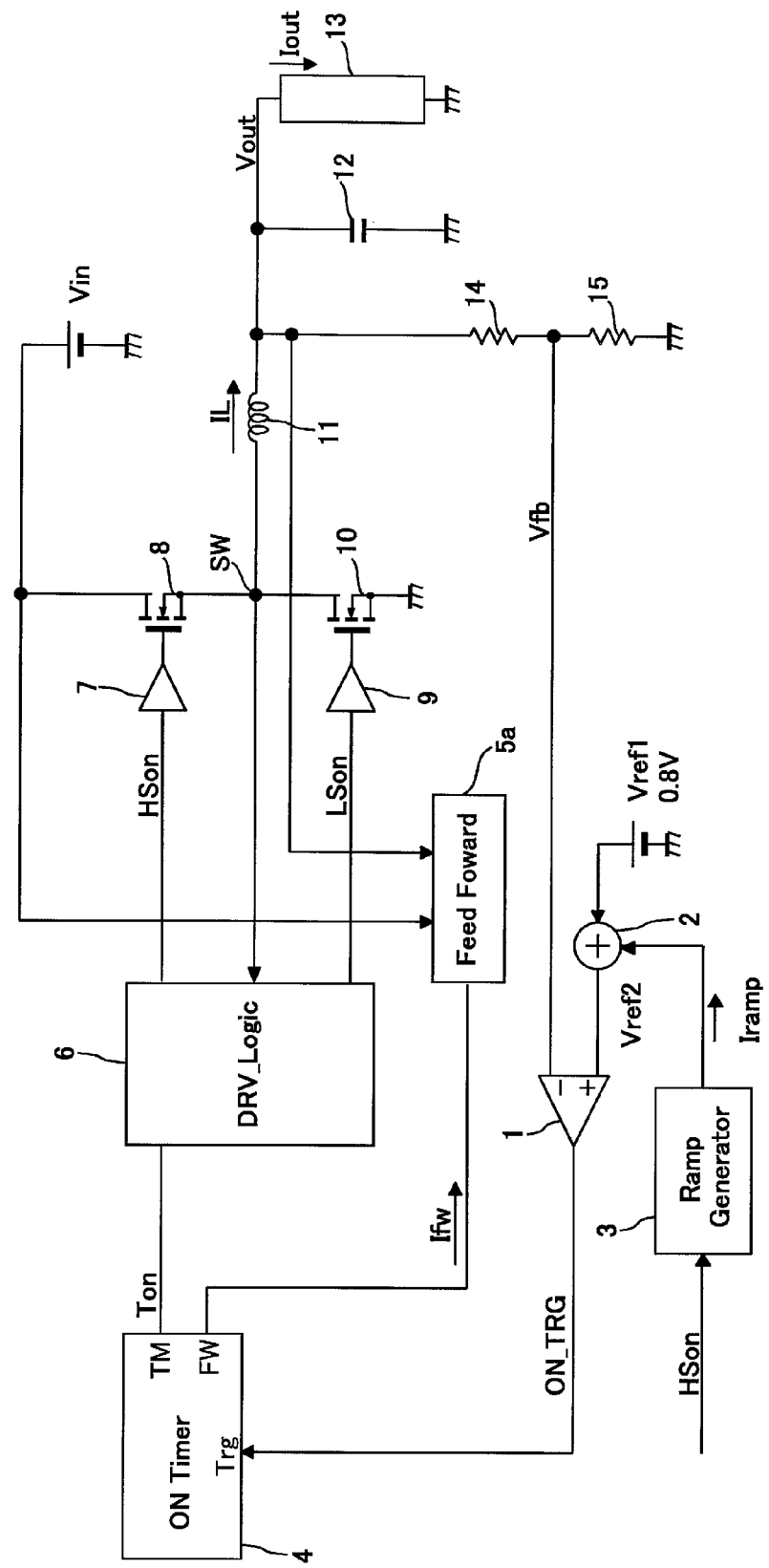

FIG. 10 is a view showing a variant of the switching power-supply device shown in FIG. 1. A switching power-supply device shown in FIG. 10 has the same configuration as that of the switching power-supply device shown in FIG. 1, except that the feed forward circuit 5 is replaced with a feed forward circuit 5a.

The feed forward circuit 5a, which has the same function as that of the feed forward circuit 5, generates and outputs a feed forward current Ifw, which is intended to maintain a substantially constant switching frequency even if setting of the input voltage Vin or the output voltage Vout is changed, to a FW terminal of the on-timer 4.

The feed forward circuit 5 described in FIG. 3 detects indirectly a voltage difference between the input voltage Vin and the output voltage Vout from a time ratio between the driving signal HSon and the driving signal LSon, thereby generating the feed forward current signal Ifw.

In contrast, the feed forward circuit 5a is configured to directly detect a voltage difference between the input voltage Vin and the output voltage Vout and then to generate a feed forward current signal Ifw depending on the difference between the input voltage Vin and the output voltage Vout. The feed forward circuit 5a serves as a signal output unit for outputting a signal depending on the difference between the input voltage Vin and the output voltage Vout.

Figure 11:
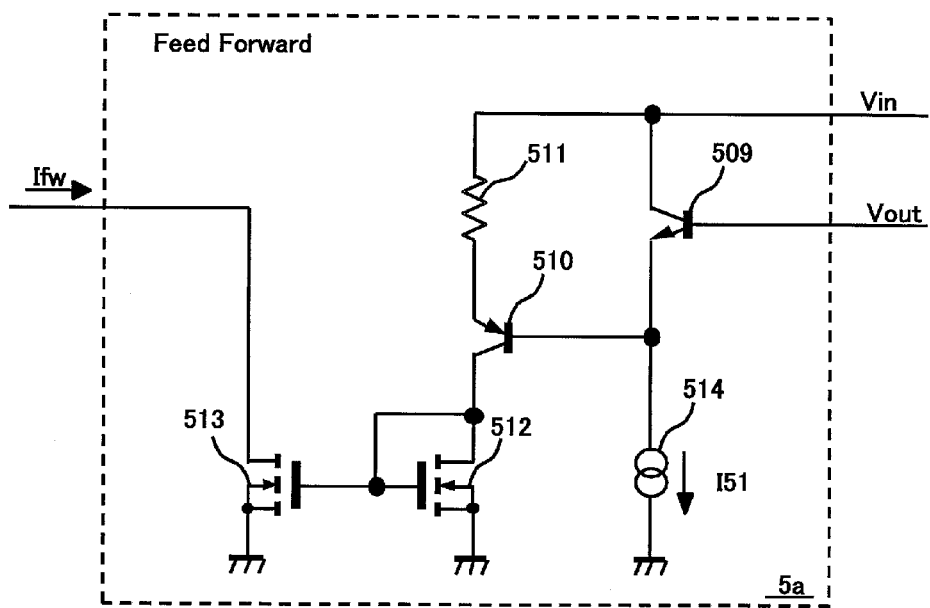

FIG. 11 is a view showing an example of a circuit configuration of the feed forward circuit 5a.

The feed forward circuit 5a includes a voltage difference detection unit configured by an NPN transistor 509, a PNP transistor 510, a resistor 511 and a constant current source 514, and a current mirror circuit configured by an NchMOSFET 512 and an NchMOSFET 513.

The voltage difference detection unit detects a voltage difference between the input voltage Vin and the output voltage Vout and then current-converts the voltage difference in the resistor 511. The current mirror circuit outputs the current-converted current, as the feed forward current Ifw, to the on-timer 4.

Thus, the larger the voltage difference between the input voltage Vin and the output voltage Vout, the higher the feed forward current Ifw is, so that a timing, at which a voltage of the capacitor 408 of the on-timer 4 become higher than the reference voltage V41, is earlier. Therefore a period, during which the ON_TRG signal is High, is controlled to be shortened.

Like as in the switching power-supply device shown in FIG. 1, the feed forward circuit 5a can realize a substantially constant switching frequency even if setting of the input voltage Vin or the output voltage Vout is changed, and additionally achieve a cost reduction as the capacitor 507 shown in FIG. 3 having a large capacitance is not required.

Figure 12:
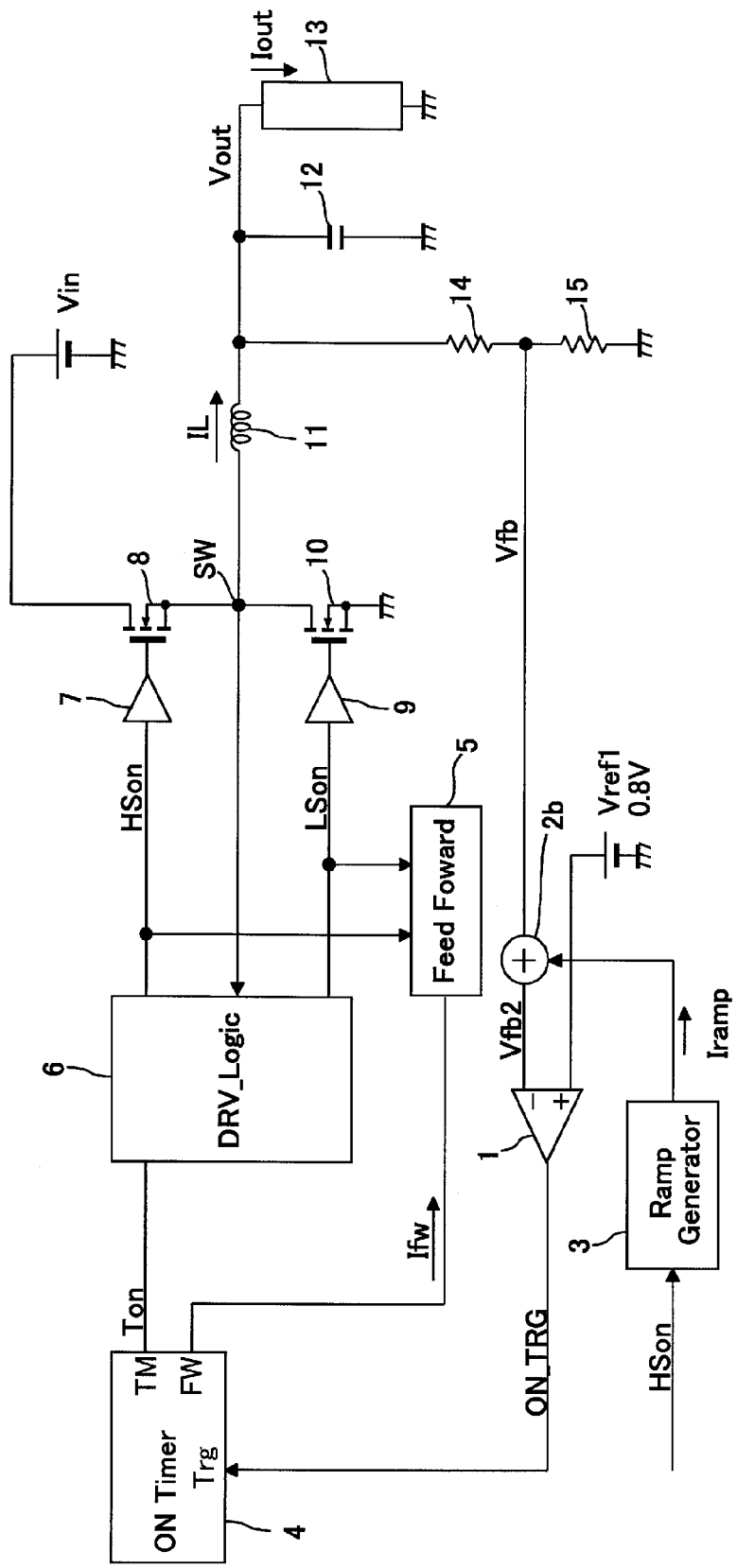
FIG. 12 is a view showing a variant of the switching power-supply device shown in FIG. 1.

FIG. 12 is a view showing a variant of the switching power-supply device shown in FIG. 1. In the switching power-supply device shown in FIG. 12, the Ramp superimposing circuit 2 is replaced with a Ramp superimposing circuit 2b.

Meanwhile, the switching power-supply device shown in FIG. 12 is different from that in FIG. 1, in that the Ramp superimposing circuit 2b is connected between the inverted input terminal of the feedback comparator 1 and the connection point between the feedback resistor 14 and the feedback resistor 15, and also the power source for supplying the first reference voltage Vref1 is connected to the non-inverted input terminal of the feedback comparator 1.

Figure 13:
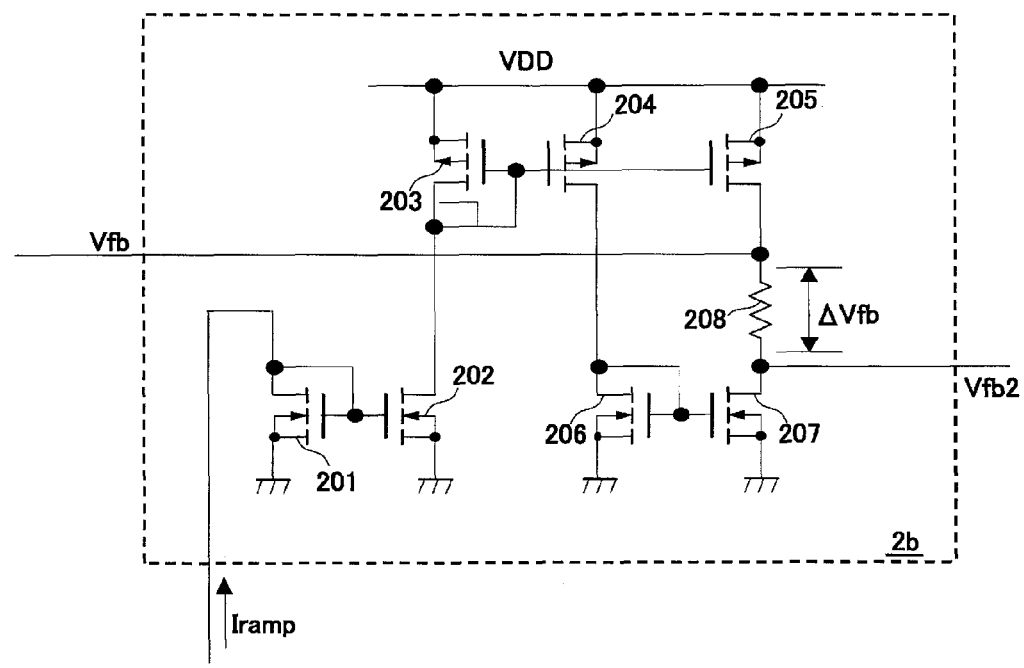
FIG. 13 is a view showing an example of a circuit configuration of a Ramp superimposing circuit 2b of the switching power-supply device shown in FIG. 12.

FIG. 13 is a view showing an example of a circuit configuration of the Ramp superimposing circuit 2b of the switching power-supply device shown in FIG. 12.

The Ramp superimposing circuit 2b shown in FIG. 13 has the same configuration as that of the Ramp superimposing circuit 2 shown in FIG. 2, except that the connection point between the feedback resistor 14 and the feedback resistor 15 is connected to a connection point between the resistor 208 and the MOSFET 205 and the inverted input terminal of the feedback comparator 1 is connected to a connection point between the resistor 208 and the MOSFET 207.

The Ramp superimposing circuit 2b generates a feedback voltage Vfb2, in which a negative-sloped Ramp component is superimposed, by supplying the Ramp current signal Iramp, which is generated by the ramp generator 3, to a MOSFET 205 side of the resistor 208 and also by extracting the Ramp current signal Iramp from a MOSFET 207 side thereof.

The ramp generator 3 and the Ramp superimposing circuit 2b serve as a feedback voltage generation unit for generating the feedback voltage Vfb2. Also, the Ramp superimposing circuit 2b serves as a superimposing unit for superimposing a ramp signal, which is depended on a voltage accumulated in the capacitor 314 of the ramp generator 3, with the feedback voltage Vfb.

In the switching power-supply device shown in FIG. 12, the feedback voltage Vfb2 having a negative-sloped signal is inputted to the inverted input terminal of the feedback comparator 1, and the first reference voltage Vref1 is inputted to the non-inverted input terminal of the feedback comparator 1. Accordingly, when the feedback voltage Vfb2 is decreased with decreasing of the output voltage Vout and thus becomes lower than the first reference voltage Vref1, the feedback comparator 1 immediately outputs the ON_TRG signal to the Trg terminal of the on-timer 4.

In this way, the switching power-supply device shown in FIG. 12 is different from that in FIG. 1 in that the ON_TRG signal is outputted by a comparison result between the feedback voltage Vfb2, which is obtained by superimposing the negative-sloped ramp signal with the feedback voltage Vfb, and the first reference voltage Vref1, but it can realize the entirely same operations as those of the switching power-supply device shown in FIG. 1.

In the foregoing description, as the generation cycle of the ON_TRG signal is shortened, the slope of the Ramp current signal Iramp becomes gentle according to the generation cycle. However, the slope of the Ramp current signal Iramp is not necessary to be linearly changed and thus may be changed in a stepwise manner.

For example, a first cycle may be set for the generation cycle of the ON_TRG signal. Then, when the generation cycle of the ON_TRG signal is shorter than the first cycle, the slope of the Ramp current signal Iramp may be set to a first value, and when the generation cycle of the ON_TRG signal is equal to or longer than the first cycle, the slope of the Ramp current signal Iramp may be set to a second value larger than the first value. The first cycle may be a minimum value of the generation cycle of the ON_TRG signal, which can be set, for example, when a load is constant.

Also in the switching power-supply devices shown in FIGS. 1 and 12, when a first state, where the generation cycle of the ON_TRG signal has a certain value, is changed to a second state, where the generation cycle of the ON_TRG signal has a value smaller than the certain value, the slope of the Ramp current signal Iramp is controlled to become gentler than a set value in the first state. The certain value corresponds to the first cycle.

In the foregoing, although specific embodiments of this disclosure have been explained, the embodiments are only examples, and various changes and modifications thereof may be made without departing from the spirit and the scope of the disclosure.

As described above, the followings are disclosed herein.

A disclosed switching power-supply device is configured to convert and output a first direct voltage supplied from an input power source to a second direct voltage by alternately turning on and off a first switching element connected to the input power source and a second switching element connected in series to the first switching element, the switching power-supply device including: a reference voltage generation unit that generates a second reference voltage in which a ramp signal is superimposed with a first reference voltage; and a driving unit that turns the first switching element from off to on, with synchronizing with a timing, at which a feedback voltage obtained by resistance voltage dividing of the second direct voltage becomes lower than the second reference voltage, wherein when a generation cycle of the timing becomes shorter than a first cycle, the reference voltage generation unit cause a slope of the ramp signal, which is to be superimposed with the first reference voltage, to become gentler than a case where the generation cycle of the timing is equal to or longer than the first cycle.

The disclosed switching power-supply device further includes: a comparison unit that compares the feedback voltage with the second reference voltage and outputs an effective signal at the timing; and a driving signal generation unit that receives the effective signal and supplies a driving signal for turning on the first switching element to the driving unit, wherein the driving unit turns on the first switching element during a period, during which the driving signal is supplied; and wherein the reference voltage generation unit comprise: a capacitor; a superimposing unit that overlaps a voltage accumulated in the capacitor, as the ramp signal, with the first reference voltage; a charging-and-discharging unit that discharges the capacitor by receiving the driving signal and charges the capacitor until the driving signal is subsequently received; a voltage holding unit that holds a voltage of the capacitor at a timing, at which the first switching element is turned from off to on in response to the driving signal; and a charging current control unit that decreases a charging current for the capacitor as the voltage held by the voltage holding unit becomes smaller.

The disclosed switching power-supply device further includes: a signal output unit outputs a signal depending on a ratio between a period, during which the first switching element is turned on, and a period, during which the second switching element is turned on, wherein, based on the signal, the driving signal generation unit shortens a period during which the driving signal is supplied to the driving unit, as the ratio of the on-period of the second switching element to the on-period of the first switching element is increased.

The disclosed switching power-supply device further includes: a signal output unit that outputs a signal according to a difference between the first direct voltage and the second direct voltage, wherein based on the signal, the driving signal generation unit shortens a period during which the driving signal is supplied to the driving unit, as the difference between the first direct voltage and the second direct voltage is increased.

A disclosed switching power-supply device is configured to convert and output a first direct voltage supplied from an input power source to a second direct voltage by alternately turning on and off a first switching element connected to the input power source and a second switching element connected in series to the first switching element, the switching power-supply device including: a feedback voltage generation unit that generates a feedback voltage in which a negative-sloped ramp signal is superimposed with a voltage obtained by resistance voltage dividing of the second direct voltage; and a driving unit that turns the first switching element from off to on, with synchronizing with a timing, at which the feedback voltage becomes lower than a reference voltage, wherein when a generation cycle of the timing becomes shorter than a first cycle, the feedback voltage generation unit cause a slope of the ramp signal, which is to be superimposed with the voltage, to become gentler than a case where the generation cycle of the timing is equal to or longer than a first cycle.

The disclosed switching power-supply device further includes: a comparison unit that compares the reference voltage with the feedback voltage and outputting an effective signal at the timing; and a driving signal generation unit that receives the effective signal and supplies a driving signal for turning on the first switching element to the driving unit, wherein the driving unit turns on the first switching element during a period, during which the driving signal is supplied; and wherein the feedback voltage generation unit comprise: a capacitor; a superimposing unit that overlaps a voltage accumulated in the capacitor, as the ramp signal, with the voltage; a charging-and-discharging unit that discharges the capacitor by receiving the driving signal and charges the capacitor until the driving signal is subsequently received; a voltage holding unit that holds a voltage of the capacitor at a timing, at which the first switching element is turned from off to on in response to the driving signal; and a charging current control unit that decreases a charging current for the capacitor as the voltage held by the voltage holding unit becomes smaller, so that the slope of the ramp signal becomes gentle.

The disclosed switching power-supply device further includes: a signal output unit that outputs a signal depending on a ratio between a period, during which the first switching element is turned on, and a period, during which the second switching element is turned on, wherein based on the signal, the driving signal generation unit shortens a period during which the driving signal is supplied to the driving unit, as the ratio of the on-period of the second switching element to the on-period of the first switching element is increased.

The disclosed switching power-supply device further includes: a signal output unit that outputs a signal according to a difference between the first direct voltage and the second direct voltage, wherein based on the signal, the driving signal generation unit shortens a period during which the driving signal is supplied to the driving unit, as the difference between the first direct voltage and the second direct voltage is increased.

What is claimed is:

1. A switching power-supply device configured to convert and output a first direct voltage supplied from an input power source to a second direct voltage by alternately turning on and off a first switching element connected to the input power source and a second switching element connected in series to the first switching element, the switching power-supply device comprising:
    a reference voltage generation unit configured to generate a second reference voltage in which a ramp signal is superimposed with a first reference voltage;
    a driving unit that turns the first switching element from off to on synchronous with a timing, at which a feedback voltage obtained by resistance voltage dividing of the second direct voltage becomes lower than the second reference voltage;
    a comparison unit that compares the feedback voltage with the second reference voltage and outputs an effective signal at the timing; and
    a driving signal generation unit that receives the effective signal and supplies a driving signal for turning on the first switching element to the driving unit, wherein the driving unit turns on the first switching element during a period in which the driving signal is supplied;
    wherein the reference voltage generation unit comprises:
        a capacitor configured to generate the ramp signal;
        a superimposing unit that overlaps a voltage accumulated in the capacitor, as the ramp signal, with the first reference voltage; and
        a charging-and-discharging unit that discharges the capacitor by receiving the driving signal and charges the capacitor until the driving signal is subsequently received,
    wherein when a load current of the second direct voltage is switched from a light load to a heavy load and a generation cycle of the timing becomes shorter than a first cycle, the reference voltage generation unit causes a slope of the ramp signal, which is to be superimposed with the first reference voltage, to become smaller than the slope of the ramp signal in a case where the generation cycle of the timing is equal to or longer than the first cycle.

2. The switching power-supply device according to claim 1, further comprising:
    a voltage holding unit that holds a voltage of the capacitor at a timing, at which the first switching element is turned from off to on in response to the driving signal; and
    a charging current control unit that decreases a charging current for the capacitor as the voltage held by the voltage holding unit becomes smaller.

3. The switching power-supply device according to claim 2, further comprising
    a signal output unit that outputs a signal depending on a ratio between a period, during which the first switching element is turned on, and a period, during which the second switching element is turned on,
    wherein, based on the signal, the driving signal generation unit shortens a period during which the driving signal is supplied to the driving unit, as the ratio of the on-period of the second switching element to the on-period of the first switching element is increased.

4. The switching power-supply device according to claim 2, further comprising
    a signal output unit that outputs a signal according to a difference between the first direct voltage and the second direct voltage,
    wherein based on the signal, the driving signal generation unit shortens a period during which the driving signal is supplied to the driving unit, as the difference between the first direct voltage and the second direct voltage is increased.

5. A switching power-supply device configured to convert and output a first direct voltage supplied from an input power source to a second direct voltage by alternately turning on and off a first switching element connected to the input power source and a second switching element connected in series to the first switching element, the switching power-supply device comprising:
    a feedback voltage generation unit configured to generate a feedback voltage in which a negatively-sloped ramp signal is superimposed with a voltage obtained by resistance voltage dividing of the second direct voltage;
    a driving unit that turns the first switching element from off to on synchronous with a timing, at which the feedback voltage becomes lower than a reference voltage;
    a comparison unit that compares the reference voltage with the feedback voltage and outputs an effective signal at the timing;
    a driving signal generation unit that receives the effective signal and supplies a driving signal for turning on the first switching element to the driving unit,
    wherein the driving unit turns on the first switching element during a period in which the driving signal is supplied, and
    wherein the feedback voltage generation unit comprises:
        a capacitor configured to generate the ramp signal;
        a superimposing unit that overlaps a voltage accumulated in the capacitor, as the negatively-sloped ramp signal, with the feedback voltage; and
        a charging-and-discharging unit that discharges the capacitor by receiving the driving signal and charges the capacitor until the driving signal is subsequently received,
    wherein when a generation cycle of the timing becomes shorter than a first cycle, the feedback voltage generation unit causes a slope of the negatively-sloped ramp signal, which is to be superimposed with the voltage, to become smaller than the slope of the negatively-sloped ramp signal in a case where the generation cycle of the timing is equal to or longer than a first cycle.

6. The switching power-supply device according to claim 5, further comprising:
    a voltage holding unit that holds a voltage of the capacitor at a timing, at which the first switching element is turned from off to on in response to the driving signal; and
    a charging current control unit that decreases a charging current for the capacitor as the voltage held by the voltage holding unit becomes smaller, so that the slope of the negatively-sloped ramp signal becomes smaller.

7. The switching power-supply device according to claim 6, further comprising
    a signal output unit that outputs a signal depending on a ratio between a period during which the first switching element is turned on, and a period during which the second switching element is turned on, wherein based on the signal, the driving signal generation unit shortens a period during which the driving signal is supplied to the driving unit, as the ratio of the on-period of the second switching element to the on-period of the first switching element is increased.

8. The switching power-supply device according to claim 6, further comprising a signal output unit that outputs a signal according to a difference between the first direct voltage and the second direct voltage, wherein based on the signal, the driving signal generation unit shortens a period during which the driving signal is supplied to the driving unit, as the difference between the first direct voltage and the second direct voltage is increased.

* * * * *